Figure 1:
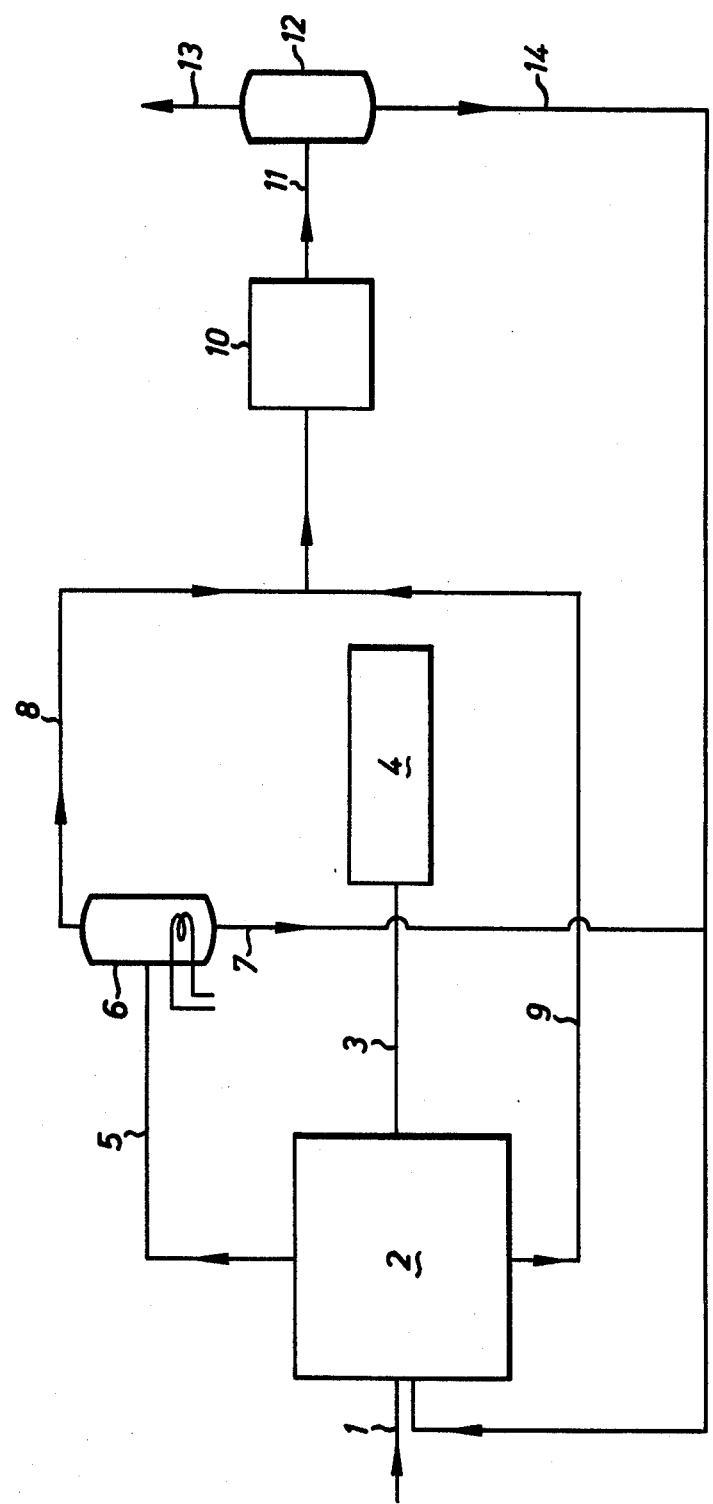

United States Patent [19]

Oldham

[11] 4,105,553
[45] Aug. 8, 1978

[54] OIL-CONTAINING EFFLUENT TREATMENT BY GRAVITY SEPARATION

[75] Inventor: Guy Franklin Oldham, London, England

[73] Assignee: The British Petroleum Company Limited, London, England

[21] Appl. No.: 783,046

[22] Filed: Mar. 30, 1977

[30] Foreign Application Priority Data

Apr. 8, 1976 [GB] United Kingdom ............... 14294/76

[51] Int. Cl.² ............................................. B01D 23/00
[52] U.S. Cl. .................................... 210/73 W; 210/74; 210/83
[58] Field of Search ................... 210/65, 71, 72, 73 W, 210/74, 83, 84, 66

[56] References Cited

U.S. PATENT DOCUMENTS

| | | | |
|---|---|---|---|
| 1,873,598 | 8/1932 | Jones | 210/73 W X |
| 3,558,482 | 1/1971 | Young | 210/73 W X |
| 3,594,314 | 7/1971 | Bilhartz | 210/73 W X |
| 3,867,285 | 2/1975 | Keller | 210/73 W X |
| 3,965,004 | 6/1976 | Garber | 210/73 W |
| 3,972,816 | 8/1976 | Mail | 210/73 W X |
| 3,977,975 | 8/1976 | Geurtsen | 210/83 X |
| 3,979,290 | 9/1976 | Loffler | 210/83 |

Primary Examiner—Sidney Marantz
Attorney, Agent, or Firm—Morgan, Finnegan, Pine, Foley & Lee

[57] ABSTRACT

Oil-containing effluent is treated by passing it through a gravity separator and obtaining (a) a wet oil fraction, (b) an aqueous fraction of reduced oil content and (c) a wet oily sludge. Fractions (a) and (c) are then combined and passed through a pressure filter so that solids are retained and oil and water passed through. The oil and water are then passed to a separator and a reusable oil fraction is recovered and a water fraction which is returned to the gravity separator.

5 Claims, 2 Drawing Figures

OIL-CONTAINING EFFLUENT TREATMENT BY GRAVITY SEPARATION

This invention relates to a method for treating (1) water-and oil-contaminated solids and (2) solids-and water-contaminated oil, particularly the top oil and bottom solid residues formed as by products from the gravity treatment of oil contaminated water, such as refinery or other industrial plant effluent.

As a first step in the treatment of oil contaminated water it is common practice to effect a rough separation in a primary gravity separator to remove the bulk of the oil and suspended solids. Suitable separators include API Separators, parallel plate separators and settlement tanks. API Separators are described in the "Manual on Disposal of Refinery Wastes", published by the American Petroleum Institute in 1969.

During this separation, oil usually associated with stabilising contaminants rises to the surface, oily sediment settles to the bottom and water containing relatively small concentrations of oil and suspended solids passes through the separator, over the effluent weir and on to further treatment if necessary.

The separated oil is not pure but also contains suspended solids and water and often traces of bacteria. Since these interfere with subsequent processing it is necessary to treat the separated oil before recharging it to processing equipment. (This is generally done by heating it in special tanks known as recovered oil or emulsion break tanks and allowing oil, water and sediment to settle out. At the end of the settling period three or four layers of material will exist. The first or top layer will be clean oil which is suitable for processing. Under this there will usually be a residual layer of unbroken sludge emulsion. The third layer will be water still containing soluble components, suspended solids and oil; and the fourth or bottom layer will be a wet oily sludge. The water and sludge may be recycled to the separator.

Recovered oil can be reprocessed or used as a source of energy and the aqueous layer from this tank may be returned to the primary gravity separator. The residual sludge emulsion from the second layer, if present, may present considerable difficulty in treatment.)

A suitable treatment for the aqueous effluent from the primary gravity separator is disclosed and claimed in our British patent specification No. 1,449,342 which claims a method for treating effluent water containing suspended oil which method comprises passing the effluent water firstly through a sand filter to remove the suspended oil and subsequently through a biological percolating filter.

The third product from the primary gravity separator, the oily bottom sludge, builds up over a period of time and the removal and disposal of this gives rise to problems. Oily sludge can have a water content in the range 20-98% by weight, an oil content in the range 1-70% by weight and the remainder is solid material such as silt (including sand, clay and chalk), rust, carbon, etc.

The only environmentally acceptable method of dealing with this sludge currently available is combustion, but this requires the provision of special incinerators which are expensive to purchase, install, operate and maintain.

We have now discovered that this oily sludge can be converted to a tractable material by a simple procedure.

Thus according to the present invention there is provided a method for the treatment of oil-containing aqueous effluent which method comprises the steps of:
(1) passing the effluent through a gravity separator and obtaining (a) a wet oil fraction which may be associated with a sludge oil emulsion, (b) an aqueous fraction of reduced oil content and (c) a wet oily sludge,
(2) heating Fraction (a),
(3) combining the heated Fraction (a) with Fraction (c),
(4) passing the resulting mixture through a filter in such manner that solids are retained and oil and water passed through and
(5) passing the oil and water to a separator and recovering a reusable oil fraction and a water fraction.

The water fraction of Stage (5) is preferably recycled to the primary separator.

The filter of Stage (4) is preferably a pressure filter such as a candle, leaf or plate filter.

Fraction (c) requires to be heated to permit the water, oil and solids to separate, but supplying heat in a conventional manner through a heat exchanger will, because of the nature of the material, result in rapid fouling.

Fraction (a), however, can be heated without any difficulty. Thus by heating Fraction (a) and subsequently combining it with Fraction (c), heat is also supplied to the latter without risk of rapid fouling.

When the filter is exhausted with respect to solids it may be cleaned by stopping the feed, forcing through the bulk of the oil still attached to the solids by passing hot water, steam or solvent in the same direction of flow as the feed and recovering a relatively oil-free solid. If desired, the solid may be dried, e.g., by air blowing. Alternatively, the wet oily solids may be scraped from the filter and treated in a similar manner elsewhere.

Our copending British patent application No. 51,189/75 discloses and claims a method for the treatment of oily sludge which method comprises the steps of filtering the sludge, treating the filtration residue with a hydrocarbon solvent and steam stripping the extracted residue.

By the method of the present invention it is possible to prevent the build up of oily sludge within the separators since the rate of offtake can be adjusted to the rate of formation and to convert this material to a concentrated solid containing about 5% by wt oil or less. Such a material is suitable for land fill operations.

Furthermore all the oil collected by the primary separator is ultimately recovered in a form suitable for further processing and all the water initially associated with the oil is recovered and recycled to the separator.

Figure 2:
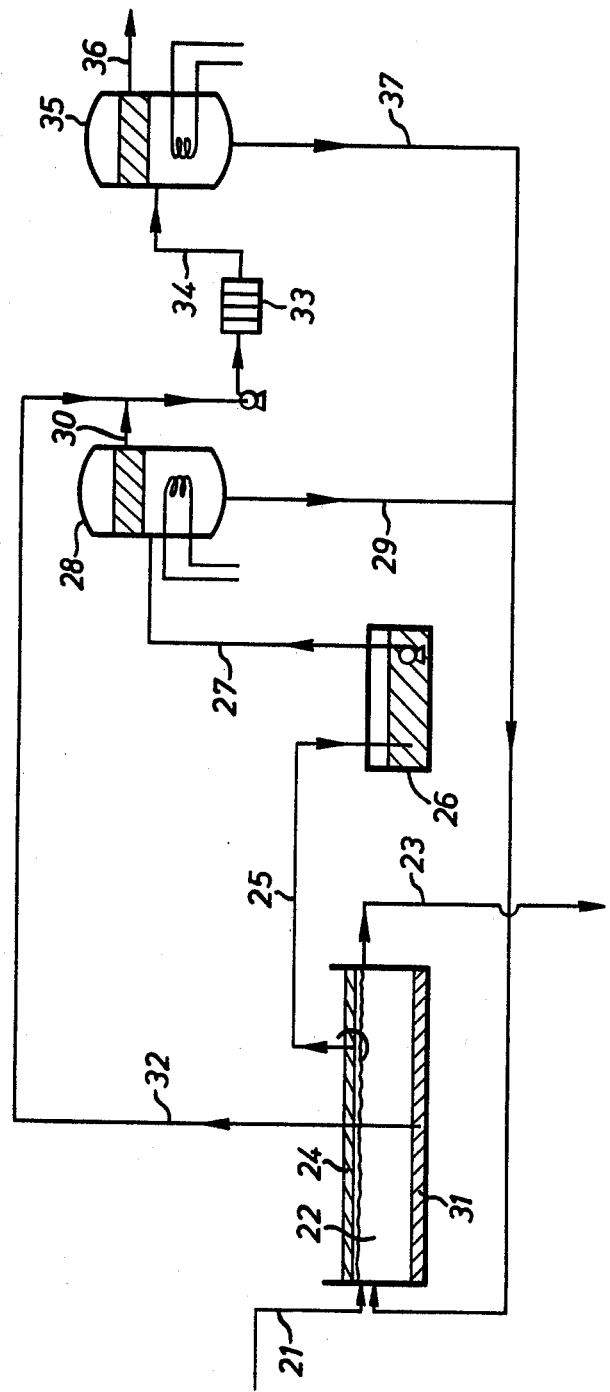

The invention is illustrated with reference to FIGS. 1 and 2 of the drawings wherein FIG. 1 is a flowsheet and FIG. 2 is a schematic representation of equipment for carrying out the method of the present invention.

With reference to FIG. 1:

Feedstock enters the system through line 1 flowing into a primary gravity separator 2 which may be open or enclosed. The advantages of a closed separator are reductions in both evaporative losses and atmospheric pollution. In the separator 2, three layers form: oil, sludge/emulsion; water; and wet oily sludge. The water passes by line 3 to secondary treatment 4, e.g. the process described in British patent specification No. 1,449,342. The oil and sludge/emulsion are withdrawn from the top of the separator by line 5 and passed to a heated recovered oil tank 6. In the tank 6 oil and water may separate to a further extent. Oily water may be recycled to the separator 2 by the line 7 and wet oil passes on through the line 8 where it joins wet oily sludge withdrawn from the bottom of the separator 2 by the line 9 to enter a pressure filter 10 which retains solid material. Liquid emerges through line 11 and passes to a second recovered oil tank 12 in which oil and water again separate. The oil, of useable quality, is removed by line 13 and the water may be recycled to the separator 2 by line 14.

With reference to FIG. 2:

A typical existing refinery system may be adapted as follows:

Oil refinery effluent is fed by line 21 to an API Separator 22. Aqueous effluent still containing traces of oil is removed for further processing by the line 23. Oil and sludge emulsion 24 are removed by line 25 to a recovered oil sump 26 from which they are pumped to a heated recovered oil tank 28 through the line 27.

In the tank 28 oil and water may separate. Water may be recycled to the API Separator 22 by the line 29 and heated, wet oil is withdrawn through the line 30.

Oily sludge 31 is withdrawn from the base of the separator 22 by line 32 and bled into the heated oil line 30. Oil and sludge are then pumped into a pressure filter 33 which retains the solids contained in the mixed sludge and oil. The oil passes on through line 34 to a second recovered oil tank 35 in which oil and water again separate. Heating is not normally required in this tank but an existing typical recovered oil tank will probably have heating facilities which may be useful in cold climates or if the recovered oil is waxy. The oil, of processable quality, is removed by line 36 and the water may be recycled to the separator 22 by line 37.

I claim:

1. A method for the treatment of oil-containing aqueous effluent which method comprises the steps of:
   (1) passing the effluent through a gravity separator and obtaining (a) a wet oil fraction, (b) an aqueous fraction of reduced oil content and (c) a wet oily sludge,
   (2) heating Fraction (a),
   (3) combining the heated Fraction (a) with Fraction (c),
   (4) passing the resulting mixture through a filter in such a manner that solids are retained and oil and water are passed through, and
   (5) passing the oil and water to a separator and recovering a reusable oil fraction and a water fraction.

2. A method according to claim 1 wherein the water fraction of step (5) is recycled to the gravity separator.

3. A method according to claim 1 wherein the filter of step (4) is a candle, leaf or plate filter.

4. A method according to claim 1 wherein the filter of step (4) is cleaned by stopping the feed, forcing through the bulk of the oil still attached to the solids by passing hot water, steam or solvent in the same direction of flow as the feed, and recovering a relatively oil-free solid.

5. A method according to claim 4 wherein the oil-free solid is subsequently dried.

* * * * *